3,108,747
THERMOSTATIC REGULATING DEVICE
Holger Dandanell Nielsen, Nordborg, Denmark, assignor to Danfoss ved ing. M. Clausen, Nordborg, Denmark, a company of Denmark
Filed Oct. 3, 1961, Ser. No. 142,549
Claims priority, application Germany Oct. 4, 1960
4 Claims. (Cl. 236—99)

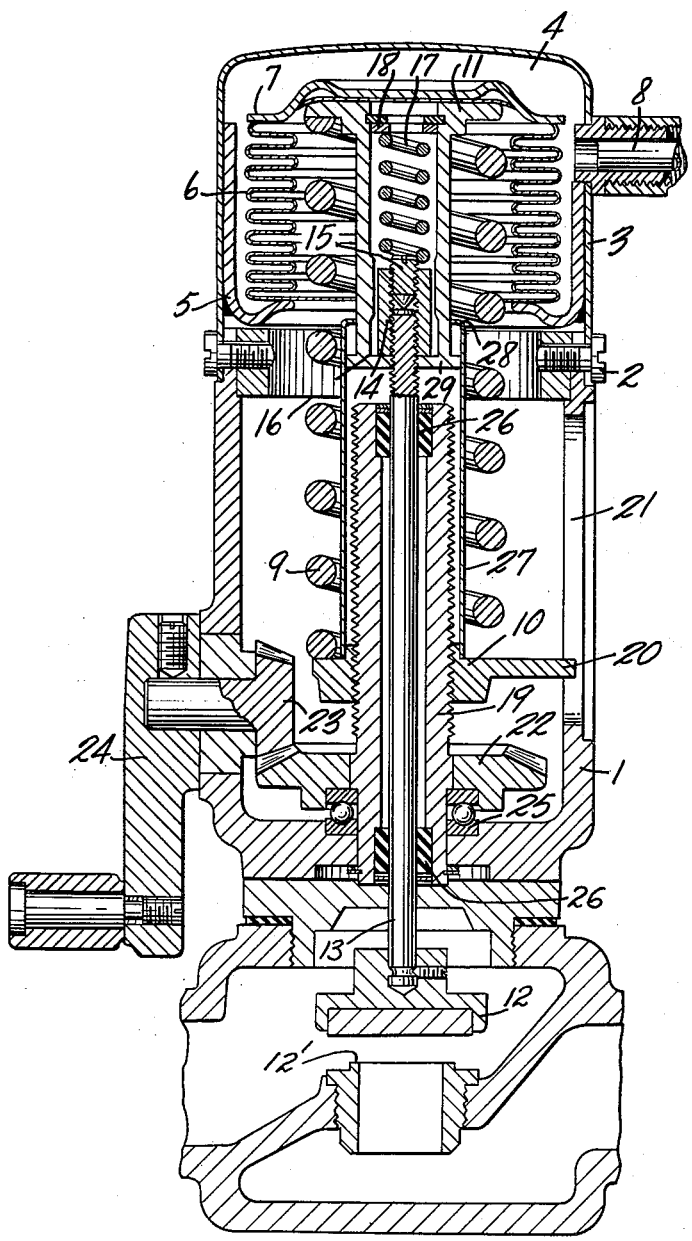

This invention relates to a thermostatic regulating device in the form of a central heating regulating valve in which a regulating link is influenced by a loaded variable volume element such as a diaphragm or bellows-element, and a push-pull coupled adjusting spring. The adjusting spring is unilaterally supported against an element which is axially adjustable with respect to the spring.

Thermostatic regulating devices of this kind are, for example, used to control the flow of the heating medium to the heating element depending on the temperature of the room to be heated. For this purpose, a temperature feeler is installed in the room, and the feeler is filled with a liquid or gaseous medium, the volume of which changes rather substantially in dependence upon the temperature. By means of a capillary tube, the temperature feeler is connected to the bellows or diaphragm element. By means of the adjusting element it is possible to adjust the tension of the spring, the spring tension operating against the pressure of the bellows or diaphragm element, so that the regulating element is operated at certain desired temperature values.

Such regulating devices have the draw-back that they operate only in dependency upon the regulating means. In cases where a fixed closed or open position of the regulating link for certain reasons is required, e.g. during repair on the tube system, the regulating link is not adjustable. If a part of the regulating system breaks down, e.g. if the adjusting spring breaks or the content of the bellows element escapes, the adjusting link will be moved to a final position which in most cases is directly opposite of that required by safety rules, and it is not possible to change the position of the regulating link.

It is the object of the invention to provide, without requiring disproportionate structural changes, a thermostatic adjusting device of the aforementioned type which has a universal adjusting movement.

According to the invention the foregoing object is achieved by the provision of a follower between the adjusting element and the regulating link. Such a follower can, under certain operating conditions, transfer the axial displacement of the adjusting element directly to the regulating link or the regulating element.

The existing axially-movable adjusting element attains, according to the invention, its function of adjusting the adjusting spring equally well by means of the follower to influence directly the regulating link or the regulating element. As the two adjusting movements (firstly on the spring and secondly directly on the regulating link or the regulating element) are mutually exclusive, the operation of the direct transferring movement must be made in dependency on "certain plant conditions."

According to a first embodiment, the follower is placed firmly on one of the two parts to be connected (e.g. the adjusting element), and must have the possibility of being connected to the other (e.g. the regulating link or the regulating element).

By switching in the connection, the "certain plant conditions" are arbitrarily caused. Before switching in, the regulating device operates in its normal way in dependence on the temperature, but after switching in, the regulating element manually can be moved to any desired position independently of the temperature. This possibility of adjusting will also be available if the adjusting spring or the bellows-element breaks down.

In view of the fact that, in most cases a direct adjusting movement is required only during unusual operating conditions, the follower can, according to another embodiment, be placed firmly on one of the two parts to be connected (e.g. the adjusting element) and the follower will bear against one side of the other part (e.g. the regulating link or the regulating element). The movement of the follower must, especially at first, occur when the difference between the pressure of the regulating element and the adjusting spring exceeds a predetermined limiting value. In this case, "the certain plant conditions" are given by this difference of pressure.

Since the most common cause of failure of thermostatic regulating devices is that the content of the bellows escapes or the system starts to leak, it is recommended that the device be constructed in such manner that the motion of the follower occurs towards the direction of the power of the adjusting spring. This has the further advantage that the adjusting spring is relieved during the adjusting movement.

According to a further feature, the adjusting element is, according to the invention, secured against turning. By reason of this, the adjusting element transfers only pure axial displacements without, as was common heretofore, transferring the torsion load to the adjusting spring by simultaneous turning of the adjusting element. This is in the present case most advantageous because the adjusting movement is further to be led in two different directions.

In this connection, it is advantageous that the adjusting element be placed on a turnable screw spindle. Thus, the adjusting element can be screwed on the external threads of the screw spindle.

According to another feature of the invention, a hand wheel is disposed on the housing of the regualting device. The turning of the hand wheel causes an axial movement of the adjusting element. Especially in connection with the above-mentioned screw spindle, the desired adjusting movements are easily controlled.

Further characteristics of the invention will be apparent from the following description with particular reference to an illustrative embodiment taken in connection with the accompanying drawing, in which a thermostatic adjustng device according to the invention is shown in longitudinal section.

The thermostatic regulating device consists of a housing 1, on the top of which an upper housing 3 is secured by means of a screw 2. In the housing 3, there is defined a chamber 4, which is limited by the walls of housing 3, and by the insert 5, the bellows-element 6, and the cover-plate 7. A capillary tube connection 8 leads to the temperature-feeler. The system consisting of the feeler and the operating chamber 4 is charged with liquid and vapor. Depending on the temperature measured by the feeler, the vapor pressure increases or decreases. This pressure change appears as a pressure on the cover-plate 7, since the interior of the bellows- element is connected to the ambient air. An adjusting spring 9 acts against this pressure, and the lower part of spring 9 bears against an adjusting element or nut 10, while the upper part of the spring bears against a transfer element or sleeve 11. The adjusting element 10 is axially adjustable so that the spring 9 can be adjusted as required.

The valve stem 13, which carries the valve body 12, has at its upper end an expanded head formed by a nut 14 and a screw 15. An inwardly directed protruding edge 16 of the transfer element 11 engages under this head. A spring 17 acts from above, and this spring engages the arrester 18 on the transfer element. The spring 17 is relatively rigid and transfers directly the normal adjusting movements. When the valve body 12 bears against its seat 12', this spring takes up any further adjusting movement of the transfer element 11.

The hollow screw spindle 19, the external threads of which are screwed on the adjusting element 10, is essential for the invention. An extension 20 of the adjusting element engages in a slot 21 in the housing 1. Due to the resulting securing of the element against turning, the adjusting element undergoes an axial displacement when the spindle 19 is turned. At the lower end of the spindle 19 is disposed a bevel gear 22 which is actuated by another bevel gear 23. The latter is connected to a crank handle 24. By turning the crank handle 24, the adjusting element 10 can, therefore, be moved up or down. The spindle is supported at its lower end by a bearing 25. The valve stem 13 is secured inside the hollow spindle by two gaskets 26.

A follower sleeve 27 is firmly connected to the adjusting element 10. The sleeve 27 has at its upper end an inwardly directed edge or flange 28, which cooperates with an outwardly-directed end edge or flange 29 on the transfer element or sleeve 11.

During operation, both the valve stem 13 and the valve body 12 adopt a position which depends on the adjusted tension of the spring 9 and the pressure of the liquid that acts in the opposite direction and from above on the bellows-element. If the temperature at the measuring point increases, the liquid, due to the change of volume, flows into the chamber 4 and the valve will close. If the temperature at the measuring point drops, then the liquid charge in chamber 4 will decrease and the valve will open so that the heating medium, at a higher temperature, will be able to flow to the area to be heated. By turning the crank handle 24, the adjusting element is displaced axially, whereby the tension of the spring 9 can be changed. In this way, a new stage of pressure balance is obtained causing another predetermined value at the measuring point.

Since not only the adjusting element 10, but also the follower sleeve 27, can be displaced by means of crank handle 24, the valve can be forced by manual operation to its closed position independently of the exterior conditions or of failure in the adjusting system. This is especially true when the liquid charged system leaks or the liquid has completely run out. In such a case, the regulating device will adopt the largest opening position permitted by the tension of the spring 9. Nevertheless, by turning down both the adjusting element 10 and the follower sleeve 27 the valve can be closed.

It is apparent that not only a heating system, but also a cooling system can be provided with this thermostatic regulating device. In this case, the valve, of course, must open at increasing temperatures at the measuring point and must close at decreasing temperatures. It is further apparent that instead of the unilateral connection described, a complete locking device between the transfer element 11 and the follower sleeve 27 can be used. Such a device can be operated as desired, and by turning the crank handle 24, the valve can be adjusted to any desired position.

I claim:

1. A thermostatic regulating device adapted to be connected to a flow-regulating valve, for acting upon a regulating valve in response to indications from a body of fluid at least partly exteriorly of said device effective to transmit variations in pressure in said fluid in response to exterior temperature variations sensed, in combination, means defining a fluid chamber adapted to contain a portion of said body of fluid, a pressure-actuated bellows disposed in said chamber and adapted to be acted upon by said fluid, a compression spring normally biasing said bellows away from its compressed position, a stem for a valve connected for movement by said bellows wherein a valve will be moved into closed position upon compression of said bellows in response to increased fluid pressure, and a valve will be moved into open position in response to decreased fluid pressure, gear means for adjusting the compression of said spring to adjust the biasing force of said spring upon the bellows, and means actuated by said gear means for effecting direct operation of the valve stem independently of the action of the bellows to move a valve into closed position, said gear means comprising a stationary nut bearing against one end of said spring, a rotatable spindle for axially moving said nut, and means for rotating said spindle, and said means for effecting direct operation of the valve stem comprising a first sleeve engaged with said valve stem, a second sleeve carried by said nut coaxially with said first sleeve, and cooperating flanges carried by said sleeves for interengagement when said second sleeve has moved a predetermined distance.

2. A thermostatic regulating device adapted to be connected to a flow-regulating valve, for acting upon a regulating valve in response to indications from a body of fluid at least partly exteriorly of said device effective to transmit variations in pressure in said fluid in response to exterior temperature variations sensed, in combination, means defining a fluid chamber adapted to contain a portion of said body of fluid, a pressure-actuated bellows disposed in said chamber and adapted to be acted upon by said fluid, a compression spring normally biasing said bellows away from its compressed position, a stem for a valve connected for movement by said bellows wherein a valve will be moved into closed position upon compression of said bellows in response to increased fluid pressure, and a valve will be moved into open position in response to decreased fluid pressure, gear means for adjusting the compression of said spring to adjust the biasing force of said spring upon the bellows, and means actuated by said gear means for effecting direct operation of the valve stem independently of the action of the bellows to move a valve into closed position, said gear means comprising a stationary nut bearing against one end of said spring, a rotatable spindle for axially moving said nut, and means for rotating said spindle, and said means for effecting direct operation of the valve stem comprising a first sleeve engaged with said valve stem, a second sleeve carried by said nut coaxially with said first sleeve, and cooperating flanges carried by said sleeves for interengagement when said second sleeve has moved a predetermined distance, said means for rotating said spindle comprises a hand wheel and gears connecting said hand wheel to said spindle.

3. In combination with a flow-regulating valve, a thermostatic regulating device for acting upon said regulating valve in response to indications from a body of fluid at least partly exteriorly of said device effective to transmit variations in pressure in said fluid in response to temperature variations sensed, said device comprising means defining a fluid chamber adapted to contain a portion of said body of fluid, a pressure-actuated bellows disposed in said chamber and adapted to be acted upon by said fluid, a compression spring normally biasing said bellows away from its compressed position, a stem for said valve connected for movement by said bellows wherein said valve will be moved into closed position upon compression of said bellows in response to increased fluid pressure, and said valve will be moved into open position in response to decreased fluid pressure, gear means for adjusting the compression of said spring to adjust the biasing force of said spring upon the bellows, and means actuated by said gear means for effecting direct operation of the valve stem independently of the action of the bellows to move the valve into closed position, said gear means comprising a stationary nut bearing against one end of said spring, a rotatable spindle for axially moving said nut, and means for rotating said spindle, and said means for effecting direct operation of the valve stem comprising a first sleeve engaged with said valve stem, a second sleeve carried by said nut coaxially with said first sleeve, and cooperating flanges carried by said sleeves for interengagement when said second sleeve has moved a predetermined distance.

4. In combination with a flow-regulating valve, a thermostatic regulating device for acting upon said regulating valve in response to indications from a body of fluid at least partly exteriorly of said device effective to transmit variations in pressure in said fluid in response to temperature variations sensed, said device comprising means defining a fluid chamber adapted to contain a portion of said body of fluid, a pressure-actuated bellows disposed in said chamber and adapted to be acted upon by said fluid, a compression spring normally biasing said bellows away from its compressed position, a stem for said valve connected for movement by said bellows wherein said valve will be moved into closed position upon compression of said bellows in response to increased fluid pressure, and said valve will be moved into open position in response to decreased fluid pressure, gear means for adjusting the compression of said spring to adjust the biasing force of said spring upon the bellows, and means actuated by said gear means for effecting direct operation of the valve stem independently of the action of the bellows to move the valve into closed position, said gear means comprising a stationary nut bearing against one end of said spring, a rotatable spindle for axially moving said nut, and means for rotating said spindle, and said means for effecting direct operation of the valve stem comprising a first sleeve engaged with said valve stem, a second sleeve carried by said nut coaxially with said first sleeve, and cooperating flanges carried by said sleeves for interengagement when said second sleeve has moved a predetermined distance, said means for reotating said spindle comprises a hand wheel and gears connecting said hand wheel to said spindle.

References Cited in the file of this patent
UNITED STATES PATENTS

| | | |
|---|---|---|
| 1,847,911 | Trane | Mar. 1, 1932 |
| 1,936,325 | Carson | Nov. 21, 1933 |
| 1,984,792 | Ford | Dec. 18, 1934 |
| 2,079,579 | Shrode | May 4, 1937 |